United States Patent
Zhuang et al.

(10) Patent No.: US 6,899,858 B2
(45) Date of Patent: May 31, 2005

(54) METHOD OF SYNTHESIS OF HAFNIUM NITRATE FOR HFO$_2$ THIN FILM DEPOSITION VIA ALCVD PROCESS

(75) Inventors: Wei-Wei Zhuang, Vancouver, WA (US); David R. Evans, Beaverton, OR (US); Sheng Teng Hsu, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 91 days.

(21) Appl. No.: 10/350,641

(22) Filed: Jan. 23, 2003

(65) Prior Publication Data

US 2004/0146448 A1 Jul. 29, 2004

(51) Int. Cl.$^7$ .......................... C01B 21/48; C01G 27/02
(52) U.S. Cl. ...................... 423/395; 423/608
(58) Field of Search .................. 423/608, 395

(56) References Cited

U.S. PATENT DOCUMENTS 5,039,502 A * 8/1991 Horn et al. ............. 423/395

6,468,494 B2 * 10/2002 Nappier et al. ............. 423/395

OTHER PUBLICATIONS

Field et al., *Tetranitratozirconium (IV) A New Volatile Compound*, Proc. Chem. Soc. 1962. pp 76–77, no month.

* cited by examiner

*Primary Examiner*—Wayne A. Langel
(74) *Attorney, Agent, or Firm*—David C. Ripma; Matthew D. Rabdau; Joseph P. Curtin

(57) ABSTRACT

A method of preparing a hafnium nitrate thin film includes placing phosphorus pentoxide in a first vessel; connecting the first vessel to a second vessel containing hafnium tetrachloride; cooling the second vessel with liquid nitrogen; dropping fuming nitric acid into the first vessel producing N$_2$O$_5$ gas; allowing the N$_2$O$_5$ gas to enter the second vessel; heating the first vessel until the reaction is substantially complete; disconnecting the two vessels; removing the second vessel from the liquid nitrogen bath; heating the second vessel; refluxing the contents of the second vessel; drying the compound in the second vessel by dynamic pumping; purifying the compound in the second vessel by sublimation to form Hf(NO$_3$)$_4$, and heating the Hf(NO$_3$)$_4$ to produce HfO$_2$ for use in an ALCVD process.

12 Claims, 1 Drawing Sheet

METHOD OF SYNTHESIS OF HAFNIUM NITRATE FOR HFO$_2$ THIN FILM DEPOSITION VIA ALCVD PROCESS

FIELD OF THE INVENTION

This invention relates to the synthesis of hafnium nitrate which is used for deposition of hafnium oxide thin films via atomic layer chemical vapor deposition (ALCVD) process.

BACKGROUND OF THE INVENTION

Hafnium and zirconium have similar chemical and physical properties. Because of these similar properties, the synthesis of hafnium nitrate, or tetranitratohafnium, may be analogous to the prior art synthesis of tetranitratozirconium; Field et al., *Tetranitratozirconium (IV) A New Volatile Compound*, Proc. Chem. Soc. 1962, pp 76–77. Field et al. carried out their reaction using zirconium tetrachloride and dinitrogen pentoxide as starting compounds. Their final product was obtained by refluxing zirconium over dinitrogen pentoxide as shown in Eq. 1:

$$ZrCl_4 + 4N_2O_5 \rightarrow Zr(NO_3)_4 + 4NO_2Cl \quad (1)$$

Dinitrogen pentoxide was produced using P$_2$O$_5$ to remove the water from fuming nitric acid, HNO$_3$, as shown in Eq. 2:

$$2HNO_3 \rightarrow N_2O_5 + H_2O \quad (2)$$

The generation of dinitrogen pentoxide was performed by using an ozone generator to oxidize N$_2$O$_4$, as shown in Eq. 3:

$$N_2O_{4(g)} + O_3 \rightarrow N_2O_5 + O_2 \quad (3)$$

The synthesis of zirconium nitrate occurs according to Eq. 4:

$$ZrCl_4 + 4N_2O_5 \rightarrow Zr(NO_3)_4 + 4NO_2Cl \quad (4)$$

The apparatus used to generate dinitrogen pentoxide is very complex. Because dinitrogen pentoxide is unstable, the storage of this compound requires special facilities. Thus, the formulation of hafnium and zirconium nitrates in preparation of oxides for ALCVD, according to the prior art, requires complex equipment and special storage facilities. It is desirable to provide a simple means of formulating the desired precursor compounds.

SUMMARY OF THE INVENTION

A method of preparing a hafnium nitrate thin film includes placing phosphorus pentoxide in a first vessel; connecting the first vessel to a second vessel containing hafnium tetrachloride; cooling the second vessel with liquid nitrogen; dropping fuming nitric acid into the first vessel producing N$_2$O$_5$ gas; allowing the N$_2$O$_5$ gas to enter the second vessel; heating the first vessel until the reaction is substantially complete; disconnecting the two vessels; removing the second vessel from the liquid nitrogen bath; heating the second vessel; refluxing the contents of the second vessel; drying the compound in the second vessel by dynamic pumping; purifying the compound in the second vessel by sublimation to form Hf(NO$_3$)$_4$, and heating the Hf(NO$_3$)$_4$ to produce HfO$_2$ for use in an ALCVD process.

It is an object of the invention formulate a hafnium nitrate compound for use in hafnium oxide ALCVD.

Another object of the invention is to provide a method of hafnium nitrate formulation which uses standard IC industry chemistry and storage facilities.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

A new synthesis method is described for the synthesis of hafnium nitrate using a reaction apparatus which is much less complex than that described in the prior art. As previously noted, the known prior art describes the synthesis of dinitrogen pentoxide first using complex equipment, including the use of an ozone generator. The dinitrogen pentoxide is then reacted with a tetrachloride to produce a nitrate. In the method of the invention, the desired end product is hafnium nitrate (Hf(NO$_3$)$_4$), and the starting material is hafnium tetrachloride (HfCl$_4$).

Figure 1:
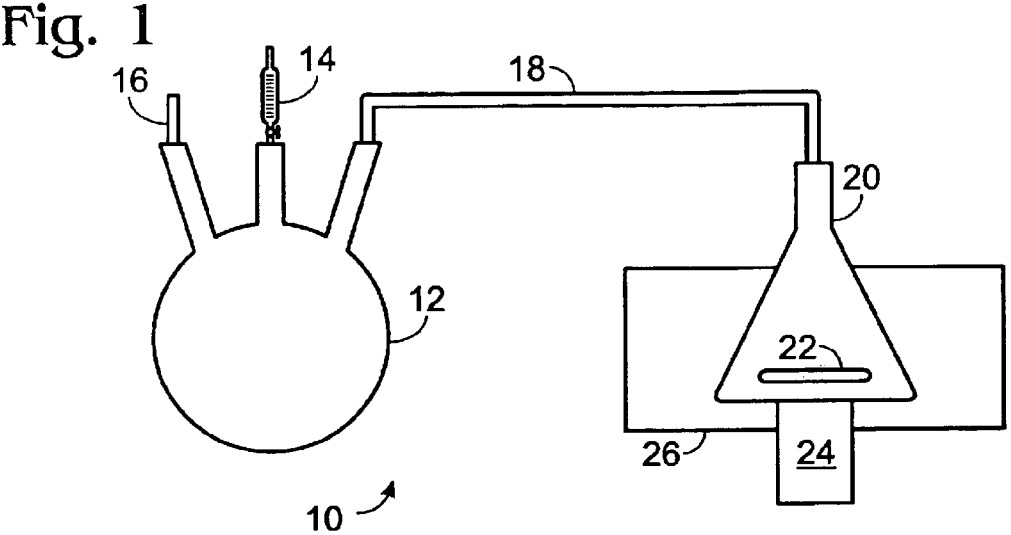
FIG. 1 depicts the apparatus used to practice the method of the invention.

In the method of the invention, a hafnium nitrate compound is produced, in high yield. Referring to FIG. 1, the apparatus used to practice the method of the invention is depicted generally at 10. Apparatus 10 includes a three-necked flask 12, also referred to herein as a first vessel. A dropping funnel 14 is provided on one neck of the flask, an out-gas adapter 16 is placed on the second neck, and a glass connection bridge 18 is placed on the third neck. Connection bridge 18 is connected to a second flask, or vessel, 20, which is equipped with a stirring bar 22 and a magnetic stirring mechanism 24. Flask 20 is surrounded by a liquid nitrogen bath 26.

Nitrogen is produced as a result of the reaction between phosphorus pentoxide (P$_2$O$_5$) and fuming nitric acid (HNO$_3$). P$_2$O$_5$ is placed in flask 12. Fuming nitric acid is placed in dropping funnel 14 and is slowly dropped into the P$_2$O$_5$ in flask 12. Hafnium tetrachloride is placed in flask 20, with stirring bar 22, and is cooled using liquid nitrogen bath 26. When fuming nitric acid is dropped into flask 12 and quickly reacted with P$_2$O$_5$, N$_2$O$_5$ is produced, and condensed into flask 20. When sufficient N$_2$O$_5$ is generated, flask 20 is disconnected from flask 12, and warmed up to about 30° C. After refluxing in N$_2$O$_5$ for a while, e.g., about 30 minutes, hafnium nitrate is produced in high yield.

$$P_2O_5 + 2HNO_3 \rightarrow N_2O_5 + 2HPO_3 \quad (5)$$

$$4N_2O_5 + HfCl_4 \rightarrow Hf(HNO_3)_4 + 4NO_2Cl \quad (6)$$

Figure 2:
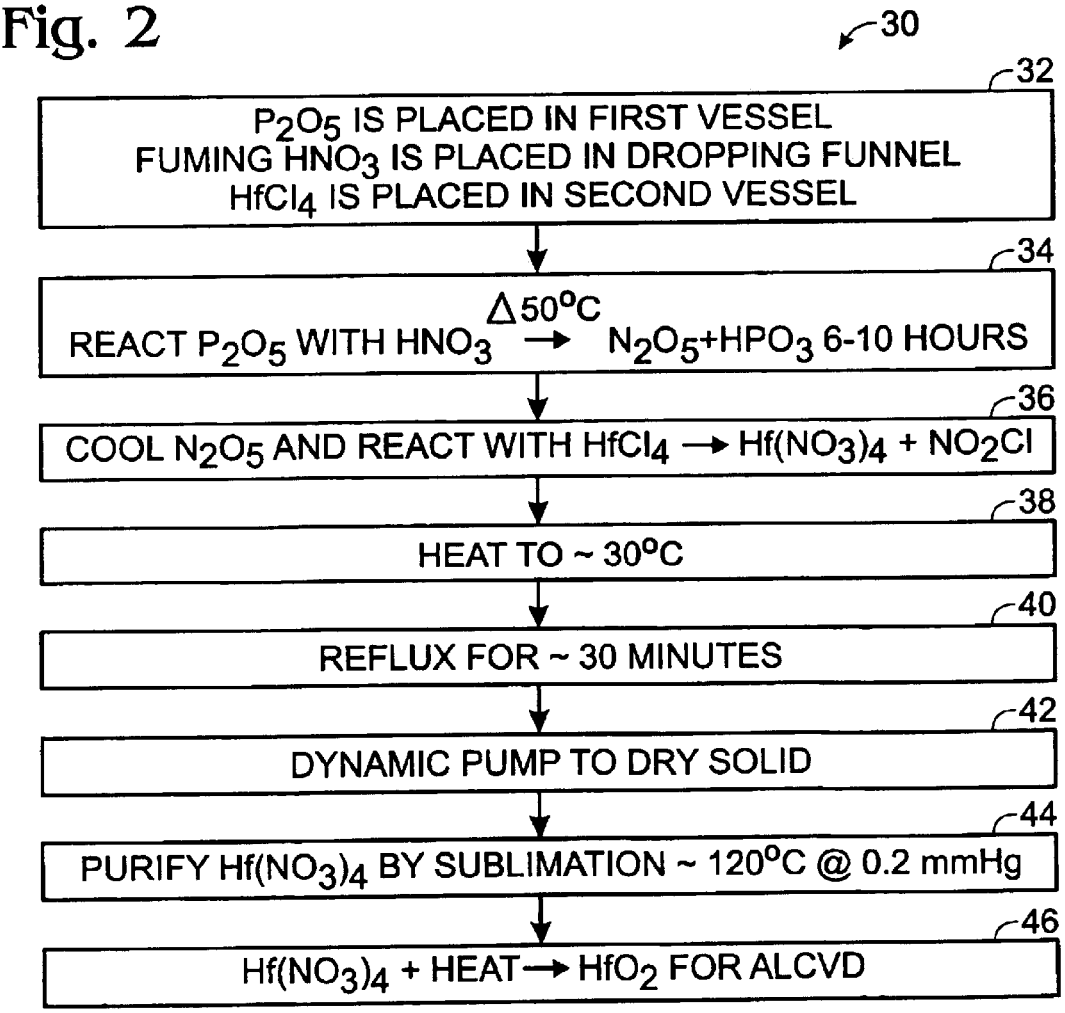
FIG. 2 is a block diagram of the method of the invention.

The following synthesis example provides a more detailed description of the method of the invention. Referring now to FIG. 2, generally at 30, approximately 100 grams of phosphorus pentoxide (P$_2$O$_5$) is placed in flask 12 at ambient room temperature. Dropping funnel 14 is filled with 80 mL fuming nitric acid. Flask 20, in the preferred embodiment, is a 100 mL flask, containing 10 grams of hafnium tetrachloride. Block 32. Stirring bar 22 is positioned in flask 20, and glass connecting bridge 18 is connected between flasks 12 and 20, forming a closed system, except on the top of flask 12, which receives dropping funnel 14 for dispensing the fuming nitric acid into flask 12. Flask 20 is cooled with liquid nitrogen. The fuming nitric acid is slowly dropped into flask 12, producing $N_2O_5$ gas, which transits connection bridge 18 and is quickly trapped in flask 20 by the cooling of liquid nitrogen bath 26. After all of fuming nitric acid is dropped into flask 12, flask 12 is slowly heated to about 50° C., producing a large number of bubbles. Block 34. After a reaction time of between about six to ten hours, some small bubbles still remain in flask 12, however, the reaction is substantially complete, so the flasks are disconnected from one another. $N_2O_5$ appears as a white solid, and substantially fills flask 20. Block 36. Flask 20 is removed from the liquid nitrogen bath and slowly warmed up to about 30° C. Block 38. At this temperature, $N_2O_5$ becomes liquid and boils. The compound is refluxed, with vigorous stirring. Block 40. After refluxing for about 30 minutes, excess liquid is removed and the compound is pumped to dryness using a dynamic pump. Block 42. A yellow-white solid is obtained. The solid is purified by sublimation at 120° C./0.2 mmHg. Block 44. The result is 12.6 grams of purified hafnium nitrate ($Hf(NO_3)_4$), which comprises a yield of approximately 94.6%, based on the volume of hafnium tetrachloride used as the starting compound.

$$Hf(NO_3)_4 \rightarrow HfO_2 + N_xO \qquad (7)$$

Eq. 7, and block 46, describes the formation of $HfO_2$ from $Hf(NO_3)_4$ by the application of heat. The $HfO_2$ thus formed may be deposited as a $HfO_2$ thin film by an ALCVD process.

Thus, a method for synthesis of hafnium nitrate for $HfO_2$ thin film deposition via ALCVD process has been disclosed. It will be appreciated that further variations and modifications thereof may be made within the scope of the invention as defined in the appended claims.

We claim:

1. A method of preparing a hafnium nitrate thin film comprising:
   placing phosphorus pentoxide in a first vessel;
   connecting the first vessel to a second vessel containing hafnium tetrachloride;
   cooling the second vessel with liquid nitrogen;
   dropping fuming nitric acid into the first vessel producing $N_2O_5$ gas to produce the following reaction:

$$P_2O_5 + 2HNO_3 \rightarrow N_2O_5 + 2HPO_3;$$

allowing the $N_2O_5$ gas to enter the second vessel to produce the following reaction:

$$4N_2O_5 + HfCl_4 \rightarrow Hf(HNO_3)_4 + 4NO_2Cl;$$

heating the first vessel until the reaction is substantially complete;
   disconnecting the two vessels;
   removing the second vessel from the liquid nitrogen bath;
   heating the second vessel;
   refluxing the contents of the second vessel;
   drying the compound in the second vessel by dynamic pumping; and
   purifying the compound in the second vessel by sublimation to produce $Hf(NO_3)_4$.

2. The method of claim 1 wherein said placing phosphorus pentoxide in a first vessel includes placing about 100 grams of phosphorus pentoxide in the first vessel; wherein said dropping fuming nitric acid into the first vessel includes placing about 80 mL of fuming nitric acid into a dropping funnel affixed to the first vessel; and wherein said containing includes placing about 10 grams of hafnium tetrachloride in the second vessel.

3. The method of claim 1 wherein said heating the first vessel includes heating the first vessel to a temperature of about 50° C. for between about six to ten hours.

4. The method of claim 1 wherein said heating the second vessel includes heating the second vessel to about 30° C.

5. The method of claim 1 wherein said purifying the compound in the second vessel by sublimation includes sublimating the compound at a temperature of about 120° C. in an atmosphere of about 0.2 mmHg.

6. The method of claim 1 which further includes heating the $Hf(NO_3)_4$ to produce $HfO_2$, which is used in an ALCVD process to form a $HfO_2$ thin film.

7. A method of preparing a hafnium nitrate thin film comprising:
   placing about 100 grams of phosphorus pentoxide in a first vessel;
   connecting the first vessel to a second vessel containing about 10 grams of hafnium tetrachloride;
   cooling the second vessel with liquid nitrogen;
   dropping about 80 mL of fuming nitric acid into the first vessel producing $N_2O_5$ gas according to the following reaction:

$$P_2O_5 + 2HNO_3 \rightarrow N_2O_5 + 2HPO_3;$$

allowing the $N_2O_5$ gas to enter the second vessel to produce the following reaction:

$$4N_2O_5 + HfCl_4 \rightarrow Hf(HNO_3)_4 + 4NO_2Cl;$$

heating the first vessel until the reaction is substantially complete;
   disconnecting the two vessels;
   removing the second vessel from the liquid nitrogen bath;
   heating the second vessel;
   refluxing the contents of the second vessel;
   drying the compound in the second vessel by dynamic pumping;
   purifying the compound in the second vessel by sublimation to produce $Hf(NO_3)_4$; and
   heating the $Hf(NO_3)_4$ to produce $HfO_2$, which is used in an ALCVD process to form a $HfO_2$ thin film.

8. The method of claim 7 wherein said heating the first vessel includes heating the first vessel to a temperature of about 50° C. for between about six to ten hours.

9. The method of claim 7 wherein said heating the second vessel includes heating the second vessel to about 30° C.

10. The method of claim 7 wherein said purifying the compound in the second vessel by sublimation includes sublimating the compound at a temperature of about 120° C. in an atmosphere of about 0.2 mmHg.

11. A method of preparing a hafnium nitrate thin film comprising:
   placing about 100 grams of phosphorus pentoxide in a first vessel;
   connecting the first vessel to a second vessel containing about 10 grams of hafnium tetrachloride;
   cooling the second vessel with liquid nitrogen;

dropping about 80 mL of fuming nitric acid into the first vessel producing $N_2O_5$ gas according to the following reaction:

$$P_2O_5 + 2HNO_3 \rightarrow N_2O_5 + 2HPO_3;$$

allowing the $N_2O_5$ gas to enter the second vessel to produce the following reaction:

$$4N_2O_5 + HfCl_4 \rightarrow Hf(NO_3)_4 + 4NO_2Cl;$$

heating the first vessel to a temperature of about 50° C. for between about six to ten hours until the reaction is substantially complete;

disconnecting the two vessels;

removing the second vessel from the liquid nitrogen bath;

heating the second vessel to a temperature of about 30° C.;

refluxing the contents of the second vessel;

drying the compound in the second vessel by dynamic pumping; and purifying the compound in the second vessel by sublimation at a temperature of about 120° C. in an atmosphere of about 0.2 mmHg to produce $Hf(NO_3)_4$.

12. The method of claim 11 which further includes heating the $Hf(NO_3)_4$ to produce $HfO_2$, which is used in an ALCVD process to form a $HfO_2$ thin film.

* * * * *